United States Patent
Chari et al.

(10) Patent No.: US 10,984,323 B2
(45) Date of Patent: Apr. 20, 2021

(54) ESTIMATING ASSET SENSITIVITY USING INFORMATION ASSOCIATED WITH USERS

(71) Applicant: International Business Machines Corporation, Armonk, NY (US)

(72) Inventors: Suresh N. Chari, Tarrytown, NY (US); Christopher Gates, West Lafayette, IN (US); Stephen C. Gates, Redding, CT (US); Youngja Park, Princeton, NJ (US); Wilfried Teiken, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1600 days.

(21) Appl. No.: 13/963,750

(22) Filed: Aug. 9, 2013

(65) Prior Publication Data

US 2014/0304199 A1    Oct. 9, 2014

Related U.S. Application Data

(63) Continuation of application No. 13/939,402, filed on Jul. 11, 2013.

(60) Provisional application No. 61/810,251, filed on Apr. 9, 2013.

(51) Int. Cl.
| | |
|---|---|
| *G06N 5/02* | (2006.01) |
| *G06F 21/55* | (2013.01) |
| *G06F 21/57* | (2013.01) |
| *G06N 20/00* | (2019.01) |

(52) U.S. Cl.
CPC ............ *G06N 5/02* (2013.01); *G06F 21/552* (2013.01); *G06F 21/577* (2013.01); *G06N 20/00* (2019.01)

(58) Field of Classification Search
USPC ............................................. 705/7.11–7.42
See application file for complete search history.

(56) References Cited

U.S. PATENT DOCUMENTS

| | | | | |
|---|---|---|---|---|
| 7,178,033 B1 * | 2/2007 | Garcia | ............ | G06F 21/10 713/165 |
| 2002/0052766 A1 * | 5/2002 | Dingman | ............ | G06Q 20/382 705/7.11 |
| 2006/0053075 A1 * | 3/2006 | Roth | ............ | G06Q 10/06 705/50 |
| 2009/0249433 A1 * | 10/2009 | Misra | ............ | G06F 21/316 726/1 |
| 2012/0101870 A1 | 4/2012 | Gates et al. | | |

OTHER PUBLICATIONS

Anonymous, Damballa Announces First-Ever Risk Scoring of Infected Assets within the Enterprise, Business Wire, New York, Dec. 8, 2010. (Year: 2010) (Year: 2010).*

(Continued)

*Primary Examiner* — Amber A Misiaszek
(74) *Attorney, Agent, or Firm* — Scully, Scott, Murphy & Presser, P.C.; Jeffrey S LaBaw

(57) ABSTRACT

Automatically estimating a sensitivity level of an information technology (IT) asset in one aspect may obtain information about an asset. Characteristics of the asset assigned based on the information may be compared with stored characteristics of known sensitive assets. A sensitivity level of the asset may be determined based on the comparing.

12 Claims, 9 Drawing Sheets

(56) References Cited

OTHER PUBLICATIONS

S. Aksoy and R. M. Haralick. Feature normalization and likelihood-based similarity measures for image retrieval. Pattern Recognition Letters, 22(5):563-582, 2001.
A. Bar-Hillel, T. Hertz, N. Shental, and D. Weinshall. Learning distance functions using equivalence relations. In Proceedings of International Conference on Machine Learning, ICML, pp. 11-18, 2003.
L. Beaudoin and P. Eng. Asset valuation technique for network management and security. In Proceedings of the Sixth IEEE International Conference on Data Mining Workshops, ICDMW '06, pp. 718-721. IEEE Computer Society, 2006.
J. M. Beaver, R. M. Patton, and T. E. Potok. An approach to the automated determination of host information value. In IEEE Symposium on Computational Intelligence in Cyber Security (CICS), pp. 92-99. IEEE, 2011.
D. E. Bell and L. J. L. Padula. Secure computer systems: Mathematical foundations. MITRE Corporation, 1, 1973.
D. Blei, A. Ng, and M. Jordan. Latent dirichlet allocation. Journal of Machine Learning Research, 3:993-1022, 2003, Submitted Feb. 2002; Published Jan. 2003.
T. Cover and P. Hart. Nearest neighbor pattern classification. IEEE Transactions on Information Theory, 13(1):21-27, Jan. 1967.
K. Jarvelin and J. Kekalainen. Cumulated gain-based evaluation of ir techniques. ACM Transactions on Information Systems, (4), Oct. 2002, pp. 422-446.
A. Kim and M. H. Kang. Determining asset criticality for cyber defense. Technical Report NRL/MR/5540-11-9350, Naval Research Lab Washington, 2011, pp. 1-33.
C. D. D Manning, P. Raghavan, and H. Schtze. Introduction to Information Retrieval. Cambridge University Press, Apr. 1, 2009, pp. 1-544.
Y. Park, S. C. Gates, W. Teiken, and S. N. Chari. System for automatic estimation of data sensitivity with applications to access control and other applications. In Proceedings of The ACM Symposium on Access Control Models and Technologies, SACMAT'11, Jun. 15-17, 2011, pp. 145-146.
Y. Park, S. C. Gates, W. Teiken, and P.-C. Cheng. An experimental study on the measurement of data sensitivitys. In Proceedings of Workshop on Building Analysis Datasets and Gathering Experience Returns for Security (BADGERS), pp. 68-75, Apr. 10, 2011.
K. Q.Weinberger, J. Blitzer, and L. K. Saul. Distance metriclearning for large margin nearest neighbor classification. In Proceedings of the Neural Information Processing Systems conference, NIPS, 2005.
R. E. Sawilla and X. Ou. Identifying critical attack assets in dependency attack graphs. In Proceedings of the 13th European Symposium on Research in Computer Security, ESORICS, pp. 18-34, 2008.
C. E. Shannon. A Mathematical Theory of Communication. Bell System Technical Journal, vol. 27, pp. 379-423, 623-656, July, Oct. 1948.
N. Shental, T. Hertz, D. Weinshall, and M. Pavel. Adjustment learning and relevant component analysis. In Proceedings of the 7th European Conference on Computer Vision—Part IV, ECCV '02, pp. 776-792, 2002.
V. Stamati-Koromina, C. Ilioudis, R. Overill, C. K. Georgiadis, and D. Stamatis. Insider threats in corporate environments: a case study for data leakage prevention. In Proceedings of the Fifth Balkan Conference in Informatics, BCI '12, pp. 271-274, Sep. 16-20, 2012.
E. M. Voorhees. Variations in relevance judgments and the measurement of retrieval effectiveness. In Proceedings of the 21 st annual international ACM SIGIR conference on Research and development in information retrieval, vol. 24, pp. 315-323, 1998.
L. Yang. Distance metric learning: A comprehensive survey, May 19, 2006, pp. 1-51.
Office Action dated Sep. 11, 2015 received in parent U.S. Appl. No. 13/939,402.
Office Action dated Mar. 24, 2016 received in parent U.S. Appl. No. 13/939,402, pp. 1-23.
Office Action dated Jul. 1, 2016 received in parent U.S. Appl. No. 13/939,402, 13 pages.
Office Action dated Jan. 13, 2017 received in parent U.S. Appl. No. 13/939,402, 16 pages.
Office Action dated Jun. 2, 2017 received in parent U.S. Appl. No. 13/939,402, 13 pages.
Office Action dated Dec. 15, 2017 received in parent U.S. Appl. No. 13/939,402, 15 pages.

* cited by examiner

ESTIMATING ASSET SENSITIVITY USING INFORMATION ASSOCIATED WITH USERS

CROSS-REFERENCE TO RELATED APPLICATIONS

This application is a continuation of U.S. Ser. No. 13/939,402, filed on Jul. 11, 2013, which claims the benefit of U.S. Provisional Application No. 61/810,251, filed on Apr. 9, 2013, which is incorporated by reference herein in its entirety.

FIELD

The present application relates generally to computers, and computer security, and more particularly to estimating asset sensitivity.

BACKGROUND

A growing number of advanced persistent threats and insider threats have demonstrated the capability of attacking specific highly sensitive entities in a government or company. The computer security community has recognized that not all IT assets have the same value or importance to the company, and, therefore, they require different levels of protection corresponding to their sensitivity and value. By prioritizing the security efforts and budget to better protect highly sensitive assets, organizations can reduce the security risk. Further, quantitative measurement of the sensitivity of IT assets enables other important applications such as intelligent file backup and business continuity planning.

To achieve this vision, all assets in an organization need to be assigned a sensitivity value that properly indicates the business value and criticality to the organization. Currently, the asset classification is primarily done manually by the system administrators with respect to the confidentiality, integrity and availability of the assets. However, there are limitations in the manual approach. For instance, it is very hard for a large organization to assign appropriate labels to all the assets in the organization. The number of assets in a large organization can grow huge, and, often, the assets are created and managed independently in different departments, so it is extremely hard to catalog and centrally manage all the assets. Additionally, most of the guidelines are descriptive and can be interpreted subjectively. Therefore, the classification of assets can differ significantly by different human judges. Furthermore, a coarse-grained (3 to 5-scale) type of ratings currently used in manual measurement may not provide the sufficient.

BRIEF SUMMARY

A method for automatically estimating a sensitivity level of an information technology (IT) asset, in one aspect, may comprise obtaining information about an asset. The method may also comprise assigning characteristics of the asset based on the information. The method may also comprise comparing the characteristics of the asset with stored characteristics of known sensitive assets. The method may further comprise determining a sensitivity level of the asset based on the comparing.

A system for automatically estimating a sensitivity level of an information technology (IT) asset, one aspect, may comprise an asset sensitivity estimator operable to execute on a processor and further operable to obtaining information about an asset. The asset sensitivity estimator may be further operable to compare characteristics of the asset assigned based on the information, with stored characteristics of known sensitive assets. The asset sensitivity estimator may be further operable to determine a sensitivity level of the asset based on the comparing.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
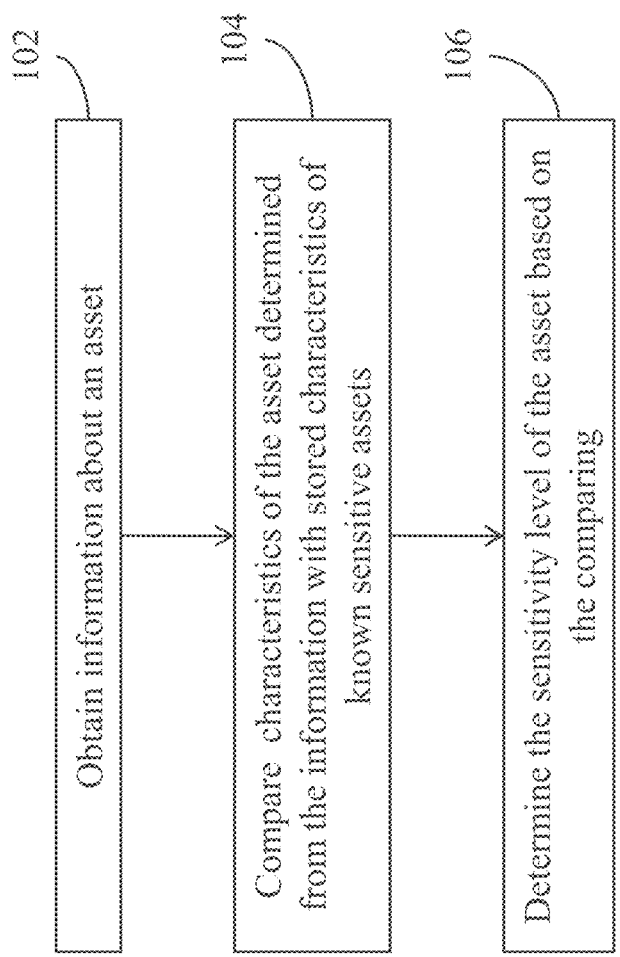
FIG. 1 illustrates a method for automatically estimating a sensitivity level of an information technology (IT) asset in one embodiment of the present disclosure.

In one embodiment of the present disclosure, system, methods and algorithms may be presented to automatically score and rank information technology (IT) assets in an enterprise, such as computer systems or data files, by their business value and criticality to the organization. Semi-automatic machine learning algorithms may be provided to automatically estimate the sensitivity of assets, e.g., by using information associated with the users. In one embodiment, the methods of the present disclosure do not require direct access to the target assets or privileged knowledge about the assets, resulting in an efficient, scalable and privacy-preserving approach. Instead, the methods in one embodiment of the present disclosure may rely on external information such as the attributes of the users, their access patterns and other published data content by the users.

The methods in one embodiment of the present disclosure may semi-automatically score various assets within an enterprise using information about the users. In one embodiment of the present disclosure, asset values may be determined using automatically extracted features that are generic to various asset types including data and network assets. In one embodiment of the present disclosure, only information about the users of the target asset may be used, e.g., including attributes of the users, their access patterns and externally published data by the users such as user (if permitted by the user) and project web pages and files shared by the users. This type of information can be extracted without requiring direct access to the target asset or detailed knowledge about the asset, such as the owner of the asset and the sensitivity of the data in the asset.

There may be many different aspects for an asset being considered sensitive, and the criterion can change over time. For instance, a computer is considered very sensitive because it stores sensitive data (i.e., confidentiality), or it hosts important applications for the business (i.e., availability). Based on these observations, the methods of the present disclosure may apply instance-based learning approaches, making the system domain independent and easy to adapt to new sensitive asset types. Given a small set of known sensitive assets, the methods of the present disclosure in one embodiment may learn their characteristics and score other sensitive assets using the models. In one embodiment of the present disclosure, a kNN (Nearest Neighbor)-based method, a clustering-based method and the kNN-based method with distance metric learning techniques are considered.

The methods in one embodiment of the present disclosure rely on meta-level information that can be extracted from most IT assets in the same way. This domain-independent set of features allows the methods of the present disclosure to be applicable to many different IT asset types. Extracting of the meta-level features does not require direct access to the target assets or privileged knowledge about the assets, and, thus, allows the methods of the present disclosure in one embodiment to be efficient and easily scalable to a large set of heterogeneous assets. In one aspect, a system of the present disclosure assigns a quantitative value to each asset rather than a coarse-grained set of labels, allowing companies to adopt more fine-grained security measures. In another aspect, semi-supervised machine learning methods of the present disclosure learn the characteristics of sensitive assets from a small number of examples.

FIG. 1 illustrates a method for automatically estimating a sensitivity level of an information technology (IT) asset in one embodiment of the present disclosure. As will be described in more detail below, a method in one embodiment of the present disclosure may estimate a sensitivity level of an asset without having to access the data content of other privileged information about the asset. At 102, information about the asset is obtained. In one embodiment of the present disclosure, obtaining the information may include identifying one or more users associated with the asset and user attributes associated with the identified one or more users. Obtaining the information may also include identifying usage features associated with the asset. An example of a usage feature may include an access pattern of a user accessing the asset. Obtaining the information may further include identifying external content features from published data available outside the asset. In one embodiment of the present disclosure, a topic may be extracted from such published data and used as the external content features. In one embodiment of the present disclosure, the features that are obtained may be normalized into comparable range. The processing of 102 is described in more detail below.

The asset may be thus characterized according to the features obtained at 102. At 104, those characteristics (e.g., assigned normalized feature values) of the asset are used to estimate its sensitivity level by comparing the characteristics with stored characteristics of known sensitive assets. The stored characteristics of known sensitive assets, for example, may also be determined by obtaining the above-described features (e.g., user features, usage features and external content features), and normalizing the data values associated with those features. For example, given a set of known sensitive assets, characteristics may be assigned to those known sensitive assets based on the features. At 106, the sensitivity level of the asset may be determined based on the comparing. The processing of 104 and 106, which may utilize one or more machine learning algorithms are also described in more detail below.

Figure 2:
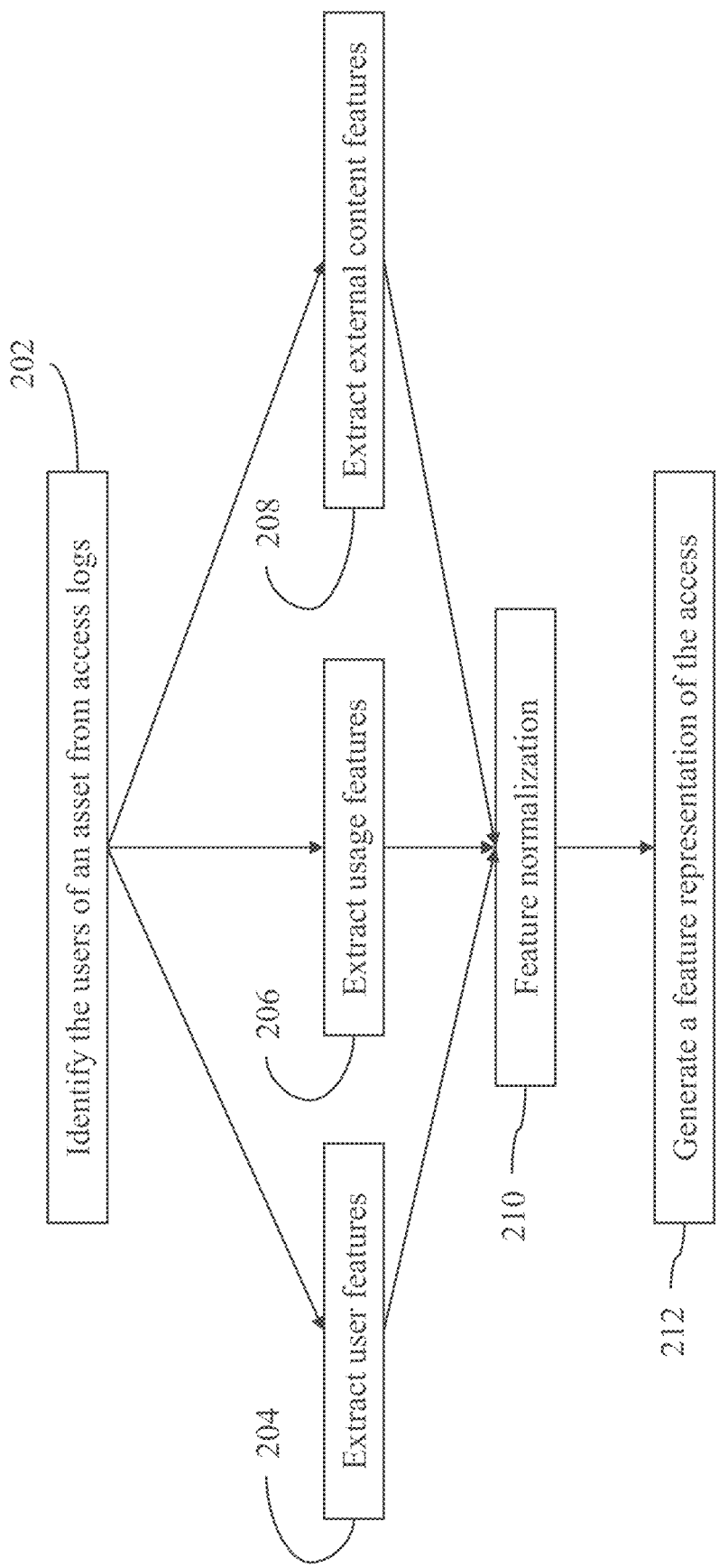
FIG. 2 illustrates details of obtaining information about an asset in one embodiment of the present disclosure.

FIG. 2 illustrates details of obtaining information about an asset, e.g., shown at 102 in FIG. 1, in one embodiment of the present disclosure. At 202, users of an asset may be identified from access logs. At 204, user features may be extracted. At 206, usage features may be extracted. At 208, external content features may be extracted. At 210, features may be normalized. At 212, a feature representation of the access may be generated. The processing shown in FIG. 2 is described in more detail below.

Meta-Level Features of Assets

A method in one embodiment of the present disclosure may identify a set of features that can be uniformly used for different asset types and be extracted without having to access the target asset or privileged knowledge about the asset. Such set of features allows the system to provide a good estimate for potentially sensitive assets in an efficient and scalable manner. Examples of such features may include features from different types of knowledge, e.g., three kinds of knowledge—who accesses the asset (user features), how they access the asset (usage features) and what kinds of tasks or projects the users work on (external content features). Table 1 describes examples of the high-level feature categories.

TABLE 1

Features for estimating the sensitivity of IT assets

| Feature Categories | Feature Definition |
|---|---|
| User Features | |
| Manager vs. NonManager | Is the user a manager or a non-manager |
| Job Roles | Job roles in the organization such as S/W Developer and Finance |
| Rank in the organizational hierarchy | The distance from the highest-ranked member to the user in the organization hierarchy |
| Usage Features | |
| Access Frequency | The total number of accesses by a user (heavy or light) |
| Access Pattern | The patterns of the accesses (e.g., regular, semi-regular, irregular) |
| External Content Features | |
| External Data Content | Topics discovered from the externally published data content |

User Features

User attributes such as job roles and the rank in the organization can affect the sensitivity of the asset. For instance, an asset used primarily by executives would elevate the sensitivity of the asset. To extract the attributes of the users, a method in one embodiment of the present disclosure may identify the users of the asset. The users may be identified by analyzing the access logs. Some access logs, such as logs for a file repository or a system log-on, typically contain the user accounts, thus, identifying the users is straightforward for these assets. For computer network assets, user accounts are generally not available in the logs (e.g., Domain Name Service (DNS) logs). Instead, the logs contain the Internet Protocol (IP) address from which the lookup was requested. The process of determining which user is performing a DNS lookup is not a trivial task. In most situations, a method in one embodiment of the present disclosure may first find the most likely candidate user who is assigned to a specific IP address during a specific time period. The resolution of an IP address to a user becomes more challenging in a dynamic system with many different ways to access the network and with a large set of users. Users can log into the network over WiFi or using an ethernet cable, or from remote locations via VPN (virtual private network).

For computers in a network, a method in one embodiment of the present disclosure may perform the IP address to user mapping using various sources including, e.g., media access control (MAC) addresses, application (e.g., internal web portals) logs, and WiFi logs. If the MAC address is present, then, during a Dynamic Host Configuration Protocol (DHCP) session setup, a method in one embodiment of the present disclosure can correlate the MAC address used for that session to the IP address that is assigned, which, in turn, can provide an IP to user mapping. However, the MAC addresses are not reliable for users using operating systems like OS X and are often unavailable when new devices are introduced. To alleviate the limitations, a method in one embodiment of the present disclosure may also use application and WiFi logs for the user mapping. The application level logs can correlate the act of a user logging into an application (such as an internal web portal) to an IP address. The WiFi logs can correlate a user establishing a connection to the WiFi with the authentication credentials that are used to log in to the system. In one embodiment, a method of the present disclosure may discard DNS lookups for which the method is unable to identify the user and logs that are resolved to more than one user (i.e., ambiguous logs).

After obtaining the set of users of an asset, a method in one embodiment of the present disclosure extract various user attributes that can indicate the users' job roles and the sensitivity of the data they generate. Table 1 shows examples of high-level categories of the user attributes that may be extracted. Examples of extracted user attributes may include Manager, NonManager, Rank-High, Rank-Middle, Rank-Low, and a number of different job roles defined in the company such as IT Specialist, Human Resources and Finance. These attributes can be extracted from companies' member directory. The feature value of each feature is the number of users who possess the attribute. For instance, if 100 managers, 500 non-managers and 1 high-rank member accessed the asset, the asset is represented Manager=100, NonManager=500 and Rank-High=1.

Usage Features

The access patterns of the users add additional insights on the sensitivity of an asset. For instance, a user who occasionally uses the asset will have less impact than a user who uses the asset frequently. On the other hand, if a user's access pattern is very regular (e.g., every day at 5 am), that may indicate that the user is running an automated job (e.g., file backup), so the accesses should not affect much on the asset's sensitivity. Analyzing typical daily DNS lookup activities may reveal a number of unique domains accessed per user in a single day. For instance, the data may show that most users access 20 to 30 different domains in a day, while a few users connect to over 200 different domains.

A method of the present disclosure in one embodiment may analyze access logs with the timestamps to discover the frequency of a user's access and the patterns of the accesses. A method in one embodiment of the present disclosure may first group the logs by each pair of a user and an asset, and record the number of log entries as the access frequency of the user to the asset. A method in one embodiment of the present disclosure may categorize the access frequency, e.g., into Heavy or Light using a pre-defined threshold. Further, a method in one embodiment of the present disclosure may determine if a connection to the asset is done through an automated access or a manual access (i.e., access pattern). It may be observed that automated accesses tend to be regular, for instance, once a day at 4 am or once every hour, while human accesses are more sporadic. Thus, automated accesses may be more predictable while human accesses may be more uncertain. Based on this observation, a method in one embodiment of the present disclosure may apply the Shannon entropy, H(X), which measures the uncertainty in a random variable to determine the access patterns.

$$H(X) = -\sum_i p(x_i)\log(p(x_i)) \quad (1)$$

Figure 7B:
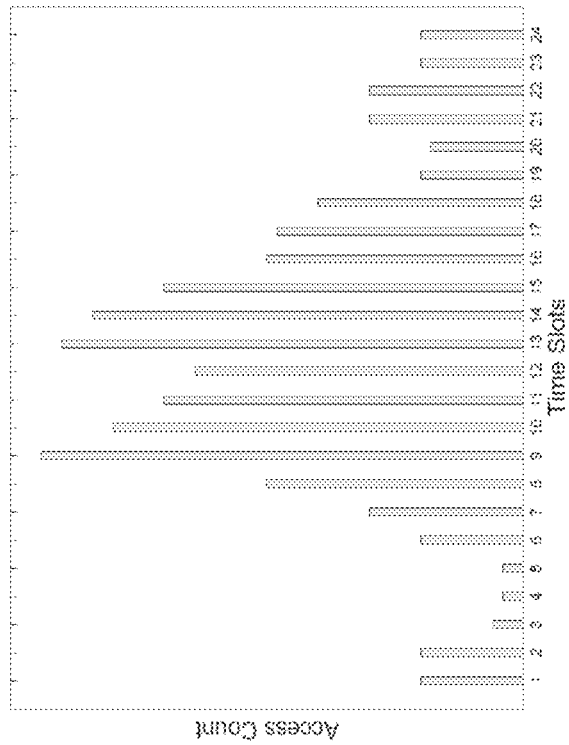
FIGS. 7A and 7B show, as an example, two sets of access patterns over the 24 time slots.
Figure 7A:
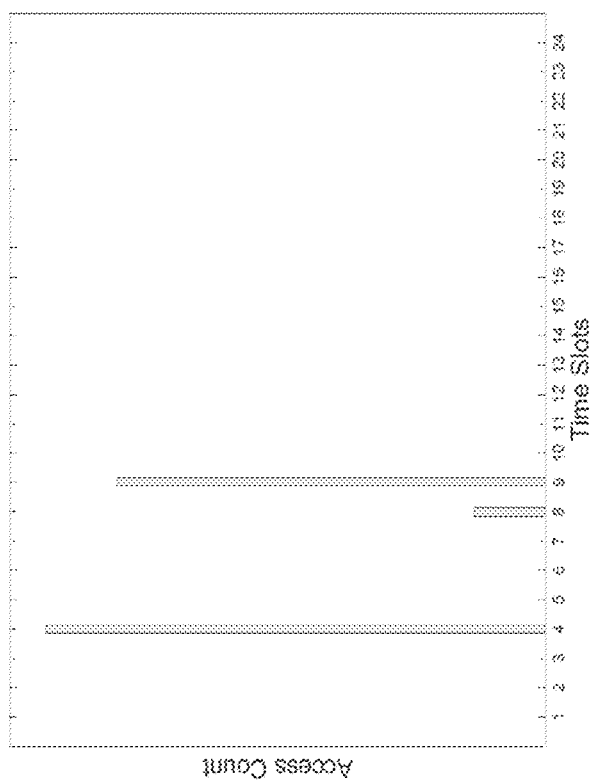

The entropy of user accesses may be measured as follows in one embodiment of the present disclosure. First, for each user and asset pair, a method in one embodiment of the present disclosure may split all the accesses over each hour of the day (i.e., grouping accesses into 24 time slots) or another time period. For instance, a method in one embodiment of the present disclosure may count how many accesses a user initiated at the 9 am-9:59 am period in the logs collected over a long period time (e.g., one year). FIGS. 7A and 7B show, as an example, two sets of access patterns over the 24 time slots. FIG. 7A illustrates cases where the accesses were made at the same time periods repeatedly, while FIG. 7B shows cases where the accesses spread across many different time slots. After obtaining a 24-dimensional count vector for a user-asset pair, a method of the present disclosure in one embodiment may then normalize the counts into probability distributions and compute the entropy. If an access distribution produces a low entropy, then the accesses are regarded as automated accesses. A method of the present disclosure in one embodiment may divide access patterns, e.g., into three categories—Regular, SemiRegular and Irregular—based on the entropy values (i.e., high, medium and low respectively).

By combining the access frequency and the access pattern features, a method of the present disclosure in one embodiment may generate 6 usage features: RegularHeavy, RegularLight, Semi-regularHeavy, Semi-regularLight, IrregularHeavy and IrregularLight. If the accesses by a user to an asset exhibit a regular pattern (i.e., low entropy), and the user has a large number of accesses, it is considered as RegularHeavy. On the other hand, if the access pattern is irregular (i.e., high entropy) and the access count is low, then it is considered as IrregularLight. Similarly to the user features, the number of users that exhibit a certain access pattern is the feature value for the asset, i.e., how many users access the asset using RegularHeavy or RegularLight pattern.

External Content Features

The sensitivity of an asset is dependent largely on how sensitive the data in the asset are, and, thus, the topics of data in the assets can be good indicators of the asset sensitivity.

In one aspect, when content inspection can be performed, the sensitivity can be measured by known techniques. When direct content inspection is not feasible, a method of the present disclosure in one embodiment may use external data contents generated by the users as a substitute. External contents of a user can include any documents or data sources the user produced outside the target asset, such as papers, patents, and project webpages. These external contents are used to conjure the user's job responsibilities and the tasks the user is working on. In one aspect, a method of the present disclosure in one embodiment may only extract the contents that can be accessed without an access permission to the host system. Some examples of external data content include: published documents such as patents and papers, titles of files the user has shared in a file-sharing site, wiki or project websites of which the user is a member, user webpages, blogs created by the user, tags the users added on webpages.

A method of the present disclosure in one embodiment may generate a document representation of an asset. Once the document representation of an asset is generated, a set of assets can be considered as a collection of documents. The document collection for all assets in an organization typically contains a large number of words. Treating individual words as features will result in a very high dimensional feature space and data sparseness issues. To reduce the dimensionality, a method of the present disclosure in one embodiment may group the words into topics, and use the topics as the content features. Each asset is then represented as the probability distributions over the discovered topics.

Feature Normalization

Machine learning methods depend on the selection of features, as the data are represented as points in a multi-dimensional feature space, where a feature corresponds to axes. Another consideration is the range of feature values. Most data mining and machine learning algorithms rely on a metric or a distance function to evaluate how similar two data points are in the feature space. When there is a large difference in the range of the feature values along different axes, these metrics implicitly assign higher weights to features with larger ranges. To mitigate the effect, a feature normalization technique is applied that converts all features into an equal range.

In one embodiment of the present disclosure, the values of the user and usage features are considered the counts of the features in the target asset, while the content topic features are considered the probabilities in a range of [0, 1]. The raw count values, especially for the usage features, can grow very large when the data set is collected over a long time period. A method of the present disclosure in one embodiment may normalize the user and usage features using the cumulative distribution function (CDF). CDF-based feature normalization is performed as follows. Given a random variable $x \in R$ with cumulative distribution function $F_x(x)$, the normalized feature value, $\tilde{x}$, of x is defined as $\tilde{x}=F_x(x)$ which is uniformly distributed in [0, 1].

Sensitivity Estimation Algorithms

The following illustrates algorithms for estimating the sensitivity of assets in one embodiment of the present disclosure. There may be many different aspects that make an asset sensitive to the organization. For instance, an asset is considered sensitive because it contains sensitive business data, or it hosts important applications. Based on these observations, a method of the present disclosure in one embodiment may apply instance-based learning approaches, in which the method learns the characteristics of sensitive assets from a small number of known sensitive assets. Therefore, the methods in the present disclosure in one embodiment do not require prior knowledge about the domain or the target assets, making the algorithms very flexible and easy to adapt to new domains. Examples of semi-supervised machine learning approaches may include: a kNN-based method, a clustering-based method, and the kNN method with distance metric learning techniques.

kNN-Based Method

The k-nearest neighbor classification is a type of instance-based learning which assigns a new data point to the majority class among its k nearest neighbors from the training data set. The k NN approach is flexible and non-parametric, and no assumption is made about the probability distribution of the features. The similarity is computed based on the distances between feature vectors in the feature space.

More formally, let $X=\{x_1, \ldots, x_n\}$ be the training data set, and $Y=\{y_1, \ldots, y_c\}$ be the set of classes. In the basic kNN classification, the class for a new data point x is defined as $\arg\max_{1 \le i \le C} \sum_{j=1}^{k} 1(y_i, y_j)$, where $y_j$ is the class of the j-th neighbor, and $1(y_i, y_j)$ is an indicator function that returns 1 if $y_i=y_j$ and 0 otherwise. In many applications, the vote is weighted by the distance between the new point and a neighbor, and the decision is influenced more by closer neighbors.

$$\arg\max_{1 \le i \le C} \sum_{j=1}^{k} \omega(d(x, x_j)) \cdot 1(y_i, y_j)$$

where $\omega(d(x, x_j))$ is a weight function that is inversely related to the distance d $(x, x_j)$.

In one embodiment, a method of the present disclosure may extend the weighted k NN approach and compute the sensitivity of a new asset based on the distance to its kNN assets in the training data and the sensitivity scores of the kNN assets. When the sensitivity scores are not provided for the training data, a method of the present disclosure in one embodiment can assign the same value to all the training data. The sensitivity of a new asset A, V(A), is then defined as a weighted average score of its k-nearest neighbors among the known sensitive assets, $\{S_1, \ldots, S_k\}$.

$$V(A) = \sum_{i=1}^{k} e^{-d(A, S_i)} \cdot V(S_i) \qquad (2)$$

$V(S_i)$ is the sensitivity value of $S_i$, and $e^{-d(A, S_i)}$ is the weight function where $d(A, S_i)$ is the Euclidean distance of the two assets. The kNN-based sensitivity estimation is described in the following algorithm, Algorithm 1.

---

Algorithm 1 Sensitivity Estimation based on k-Nearest Neighbors

---

1: Input: Unlabeled assets A = $\{A_1,\ldots,A_n\}$, a set of known sensitive assets S = $\{S_1,\ldots,S_m\}$, and, optionally, the sensitivity scores of S, V = $\{V(S_1),\ldots,V(S_m)\}$
2: Output: Ordered list of assets A'= $\{A'_1,\ldots,A'_n\}$, where $V(A'_i) \ge V(A'_{i+1})$
3: for $A_i \in A$ do
4:     kNN $(A_i) \leftarrow \{S_j,\ldots,S_k\}$, k assets from S that are closest to $A_i$
5:     Compute the sensitivity of $A_i$, $V(A_i)$ using Equation (2)
6:     Sort A in descending order of $V(A_i)$

---

Figure 3:
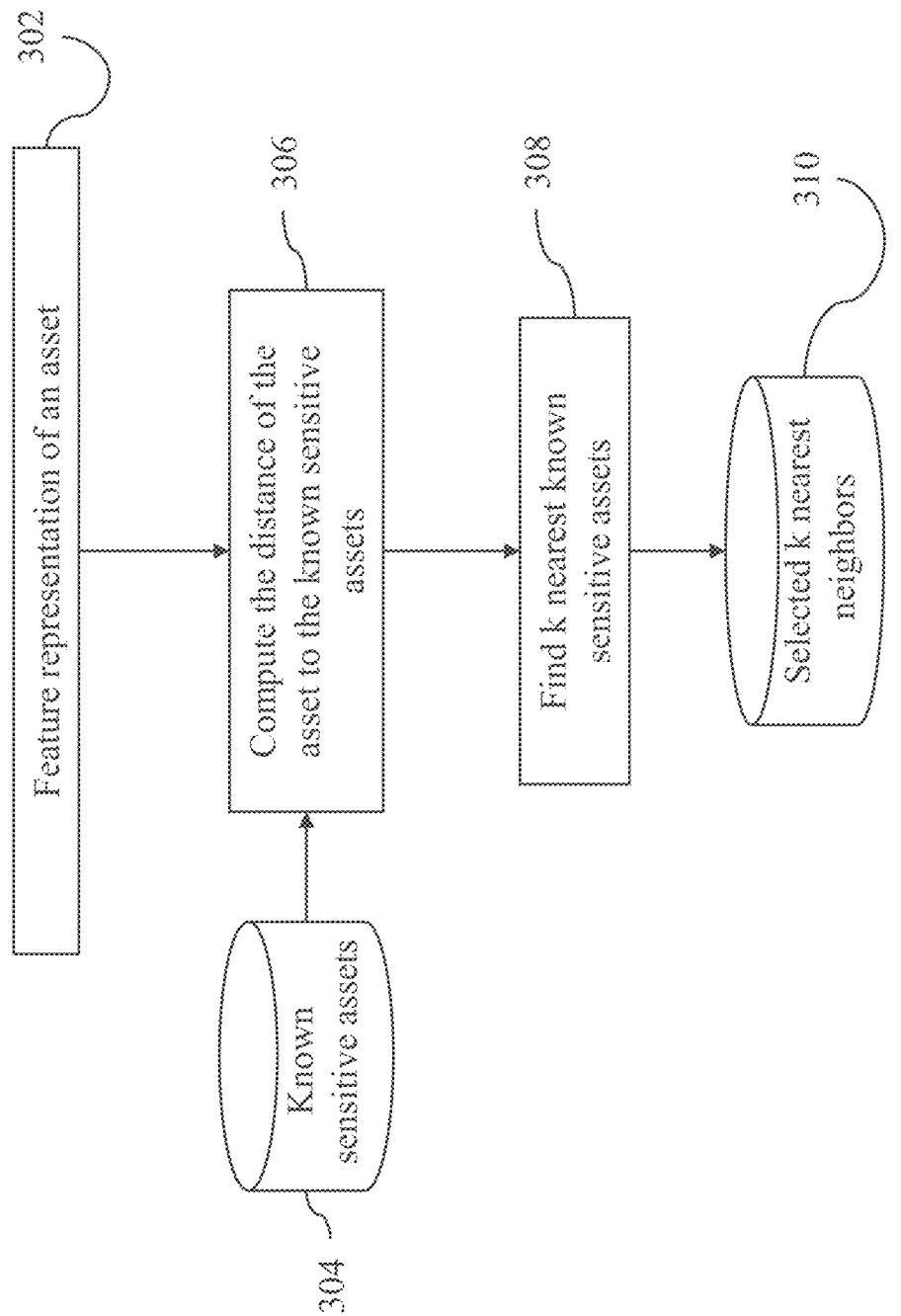
FIG. 3 is a flow diagram illustrating a kNN-based method in one embodiment of the present disclosure.

FIG. 3 is a flow diagram illustrating a kNN-based method in one embodiment of the present disclosure. At 302, a feature representation of an asset is received. Such feature representation, e.g., may be generated using the method shown in FIG. 2 in one embodiment of the present disclosure. At 304, information associated with known sensitive assets is received. At 306, a distance of the asset to known sensitive assets may be computed. At 308, k nearest known sensitive assets are determined. At 310, k nearest neighbors are selected.

Clustering-Based Method

The clustering-based method considers that the assets are from many different business units such as product development groups, HR or Finance department, and, therefore, they will naturally form distinct groups. Suppose only one sensitive asset from the HR department is included in the training data. With the kNN method with k>1, the sensitivity of assets from the HR department will be measured with assets from other departments. By taking into account the subgroups in the dataset, a method of the present disclosure in one embodiment may determine the sensitivity level of an asset using the sensitive assets from the same subgroup.

Figure 8B:
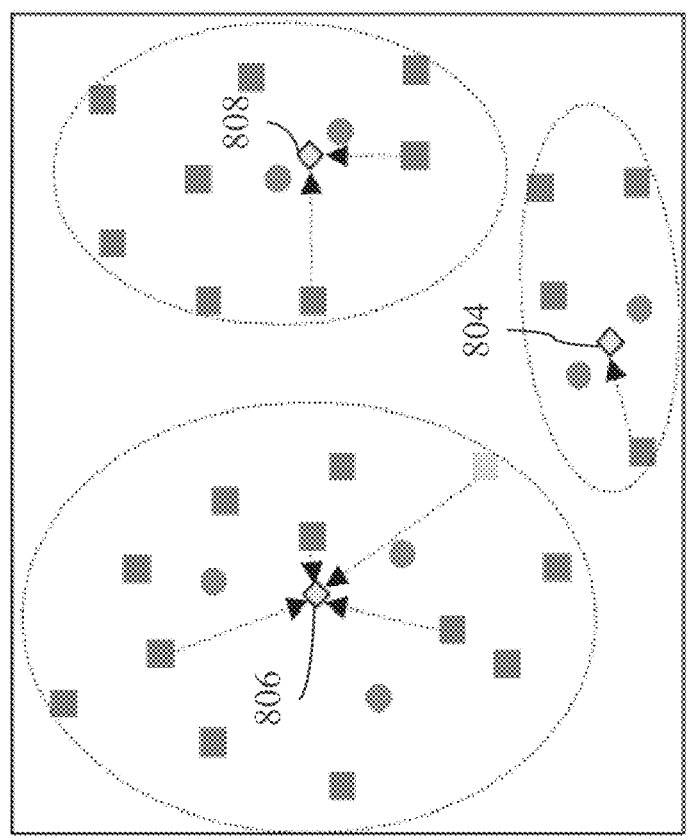
FIGS. 8A and 8B illustrate the kNN and clustering-based methods for sensitivity estimation in one embodiment of the present disclosure.
Figure 8A:
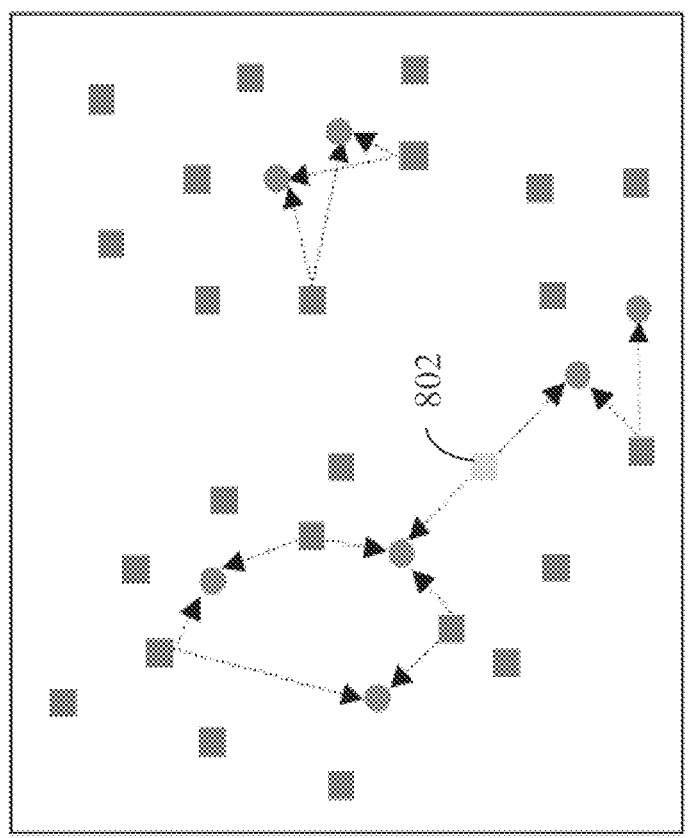

First, a clustering technique is used to discover these underlying subgroups in the data set. A method of the present disclosure in one embodiment may then generate the centroid of the sensitive assets in each cluster, which is the mean of the sensitive assets in the cluster. Similarly to the kNN-based method, a method of the present disclosure in one embodiment may measure the sensitivity of an asset A as the weighted average score of the k-nearest centroids as described in Algorithm 2. The difference of the kNN-based approach and the clustering-based approach is illustrated in FIGS. 8A and 8B. FIGS. 8A and 8B illustrate the k NN and clustering-based methods for sensitivity estimation. The circle symbols denote known sensitive assets and the square symbols denote unlabeled assets. FIG. 8A illustrates a kNN-based method where k=2. FIG. 8B illustrates a Nearest centroid-based method. The diamond symbols (804, 806, 808) in FIG. 8B represent the centroid of the sensitive assets in each cluster. Note that the sensitivity of the light-colored (yellow) square 802 is measured with a sensitive asset from a different cluster in FIG. 8B.

---

Algorithm 2: Sensitivity Estimation based on k-Nearest Centroids

1: Input: Unlabeled assets $A = \{A_1, \ldots, A_n\}$, a set of known sensitive assets $S = \{S_1, \ldots, S_m\}$, and, optionally, the sensitivity scores of S, $V = \{V(S_1), \ldots, V(S_m)\}$
2: Output: Ordered list of assets $A' = \{A'_1, \ldots, A'_n\}$, where $V(A'_i) \geq V(A'_{i+1})$
3: Cluster all assets, $A \cup S$, into K subgroups, $C = \{C_i, \ldots, C_K\}$.
4: for $C_i \in C$ do
5:     $S^i$ $C_i \cap S$ // the set of sensitive assets in $C_i$
6:     $\overline{C}_i \leftarrow$ the centroid of $S^i$.
7:     $V(\overline{C}_i) \leftarrow$ the mean sensitivity value of $S^i$.
8: for $A_i \in A$ do
9:     Let $\overline{C} = \{\overline{C}_1, \ldots, \overline{C}_k\}$ be the k nearest centroids from $A_i$
10:
$$V(A_i) \leftarrow \sum_{i=1}^{k} e^{-d(A,\overline{C}_i)} \cdot V(\overline{C}_i)$$

11: Sort A in descending order of $V(A_i)$

---

Figure 4:
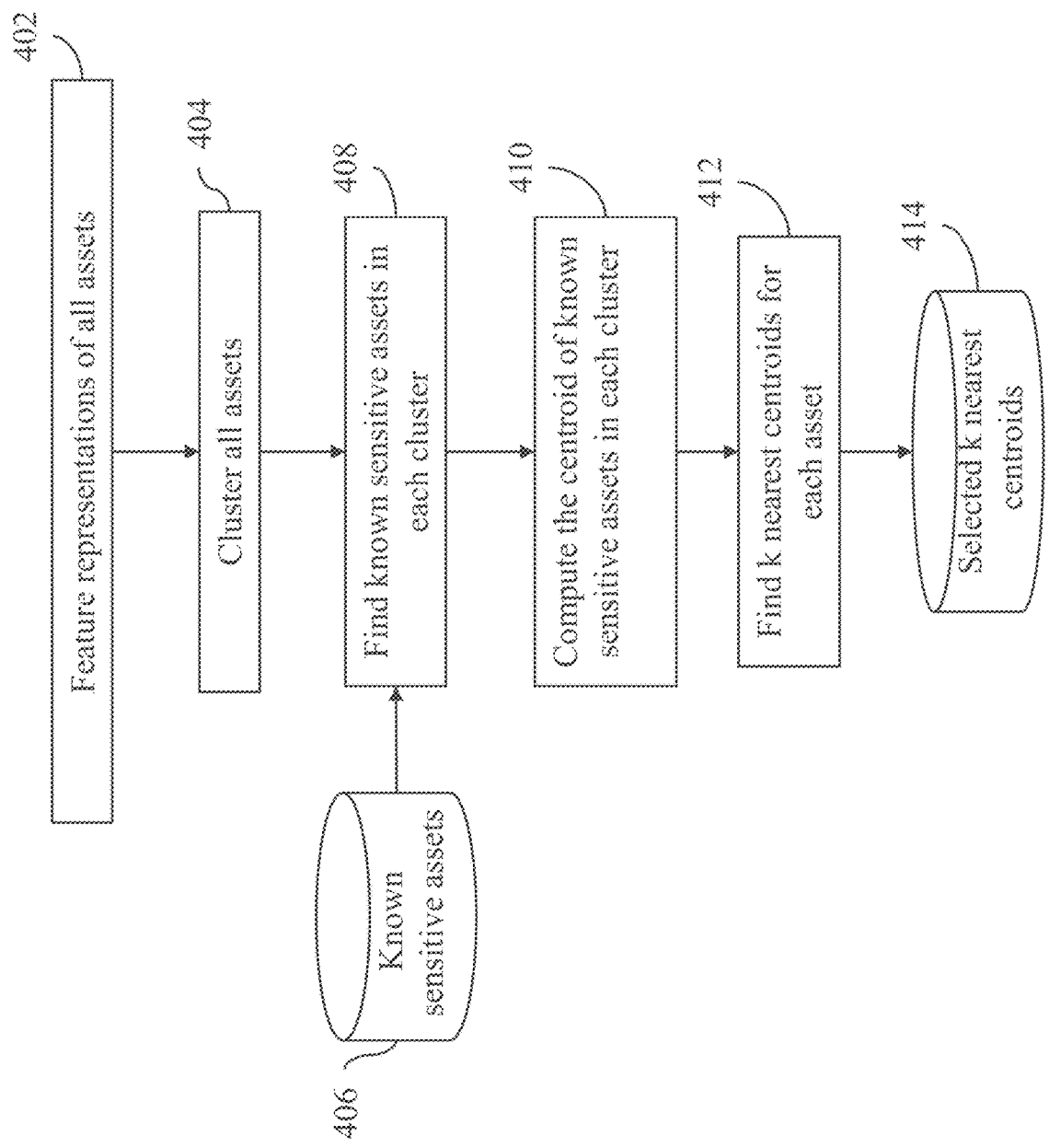
FIG. 4 is a flow diagram that illustrates a clustering-based method in one embodiment of the present disclosure.

FIG. 4 is a flow diagram that illustrates a clustering-based method in one embodiment of the present disclosure. At 402, feature representations of assets may be received. Such feature representation, e.g., may be generated using the method shown in FIG. 2 in one embodiment of the present disclosure. At 404, the assets are clustered. At 406, known sensitive assets are received, e.g, retrieved from a database storing information associated with historical sensitive assets. At 408, one or more known sensitive assets are located in each cluster. At 410, the centroid of known sensitive assets in each cluster is computed. At 412, k nearest centroids for each asset is located. At 414, k nearest centroids are selected.

kNN Method with Distance Metric Learning

The accuracy of many machine learning algorithms including both kNN classification and clustering depend on the distance (or similarity) metric used for the input data. However, when the data are in a high-dimensional space, the selection of an optimal distance metric is not intuitive. Distance metric learning is a machine learning technique that aims to automatically learn a distance metric for the input data from a given set of labeled data points. The basic idea is to learn a distance metric that puts instances from a same class closer each other and instances from different classes far apart. An automatically learned distance metric improves the accuracy of classification, clustering and retrieval tasks.

Distance metric learning algorithms are further divided into global distance metric learning and local distance metric learning. Global distance metric learning algorithms learn a distance metric that satisfy all the pairwise constraints, i.e., keep all the data points within the same classes close, while separating all the data points from different classes. Local distance metric learning algorithms, on the other hand, learn a distance metric satisfying local constraints.

A method in one embodiment of the present disclosure may apply a global distance learning algorithm and a local distance metric learning algorithm to transform the feature space. For global learning, a method in one embodiment of the present disclosure may apply Relevant Component Analysis (RCA) to learn a distance metric. The RCA-based distant metric learning algorithm learns a Mahalanobis distance metric using only equivalence constraints (i.e., instances in the same class) and finds a new feature space with the most relevant features from the constraints. It maximizes the similarity between the original data set X and the new representation Y constrained by the mutual information I(X,Y). By projecting X into the new space through feature transformation, two data objects from the same class have a smaller distance in Y than in X. For local distance metric learning, a method in one embodiment of the present disclosure may apply the Large Margin Nearest Neighbor (LMNN) distance learning algorithm. The LMNN algorithm also learns a Mahalanobis distance metric, but it identifies k-nearest neighbors, determined by Euclidean distance, that share the same label and enforces the k-nearest neighbors belong to the same class while instances from different classes are separated by a large margin.

After the feature space projection using the distance metric learning algorithms, a method in one embodiment of the present disclosure may apply the k NN-based sensitivity estimation method as described in Algorithm 1.

Figure 5:
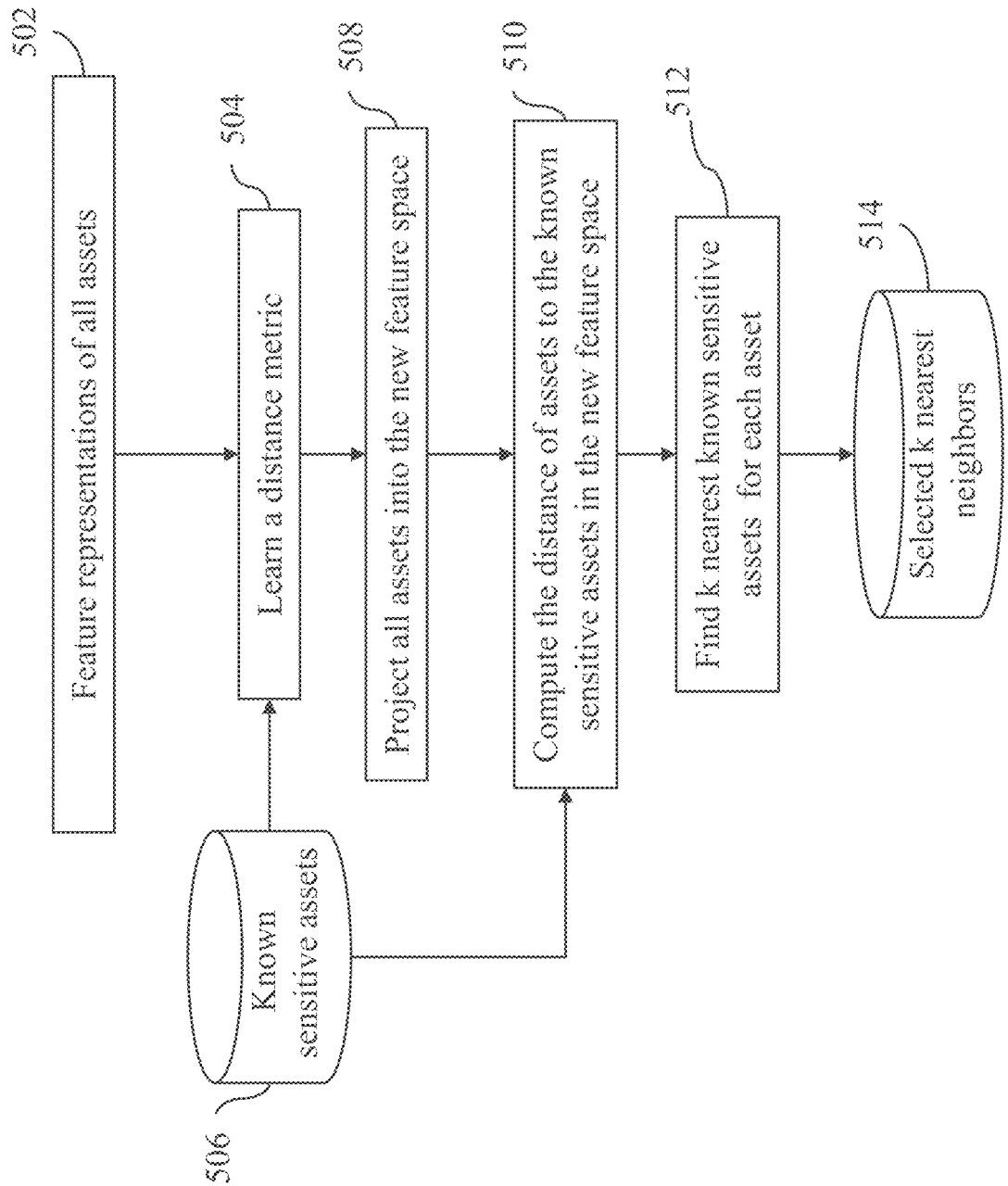
FIG. 5 is a flow diagram that illustrates a kNN-based method with distance metric learning in one embodiment of the present disclosure.

FIG. 5 is a flow diagram that illustrates a kNN-based method with distance metric learning in one embodiment of the present disclosure. At 502, feature representations of assets may be received. Such feature representation, e.g., may be generated using the method shown in FIG. 2 in one embodiment of the present disclosure. At 504, a distance metric is learned based on known sensitive assets 506, e.g, retrieved from a database storing information associated with historical sensitive assets. At 508, assets may be projected into a new feature space. At 510, a distance of assets to known sensitive assets (e.g., 506) is computed in the new feature space. At 512, k nearest known sensitive assets for each asset is located. At 514, k nearest neighbors are selected.

Figure 6:
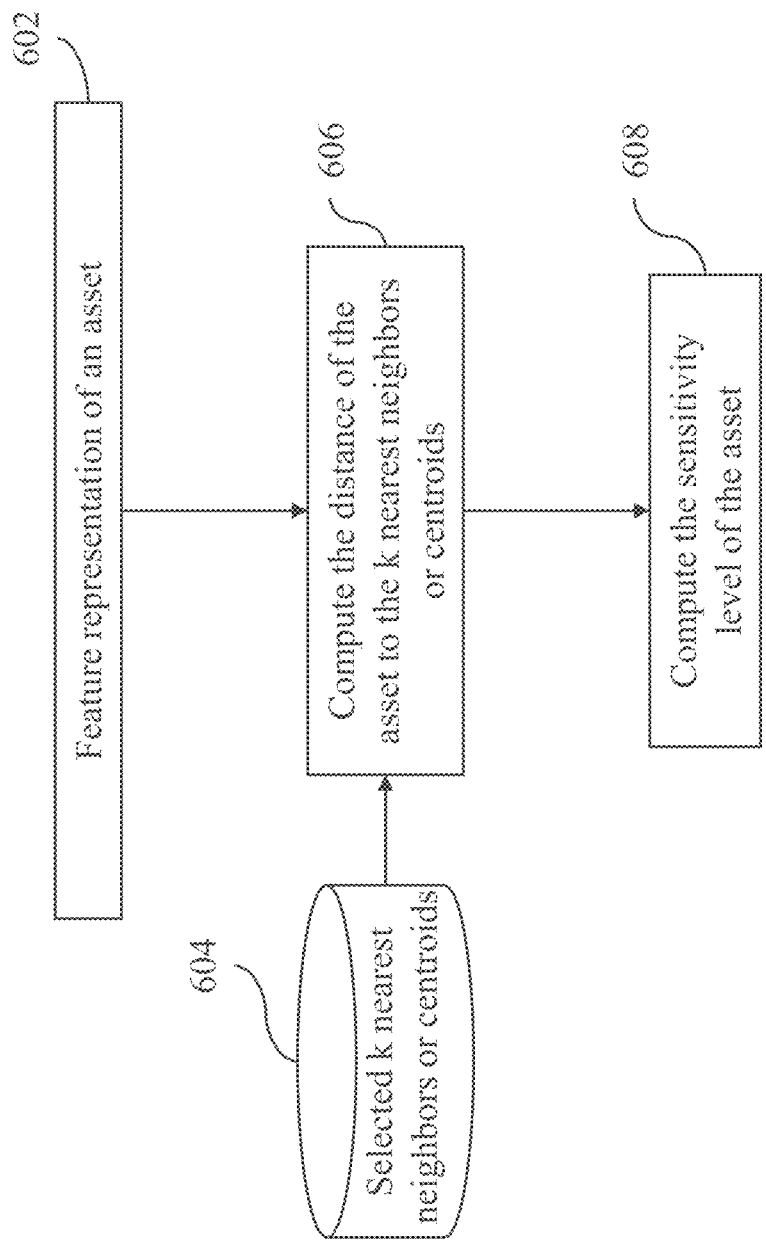
FIG. 6 is a flow diagram that illustrates determining a sensitivity level of an asset in one embodiment of the present disclosure.

FIG. 6 is a flow diagram that illustrates determining a sensitivity level of an asset based on the comparing, e.g., shown at 106 in FIG. 1, in one embodiment of the present disclosure. At 602, feature representations of assets may be received. Such feature representation, e.g., may be generated using the method shown in FIG. 2 in one embodiment of the present disclosure. At 604, selected k nearest neighbors or centroids may be retrieved from a database (e.g., 604). For instance, that information may be generated according to one or more methods shown in FIGS. 3-5. At 606, a distance of an asset to the k nearest neighbors or centroids may be computed. At 608, a sensitivity level of the asset may be computed based on the distance.

In one aspect, the problem of identifying sensitive assets can be characterized as an information retrieval (IR) problem—finding relevant (sensitive) assets in a large collection of assets and ranking them according to their relevance.

Figure 9:
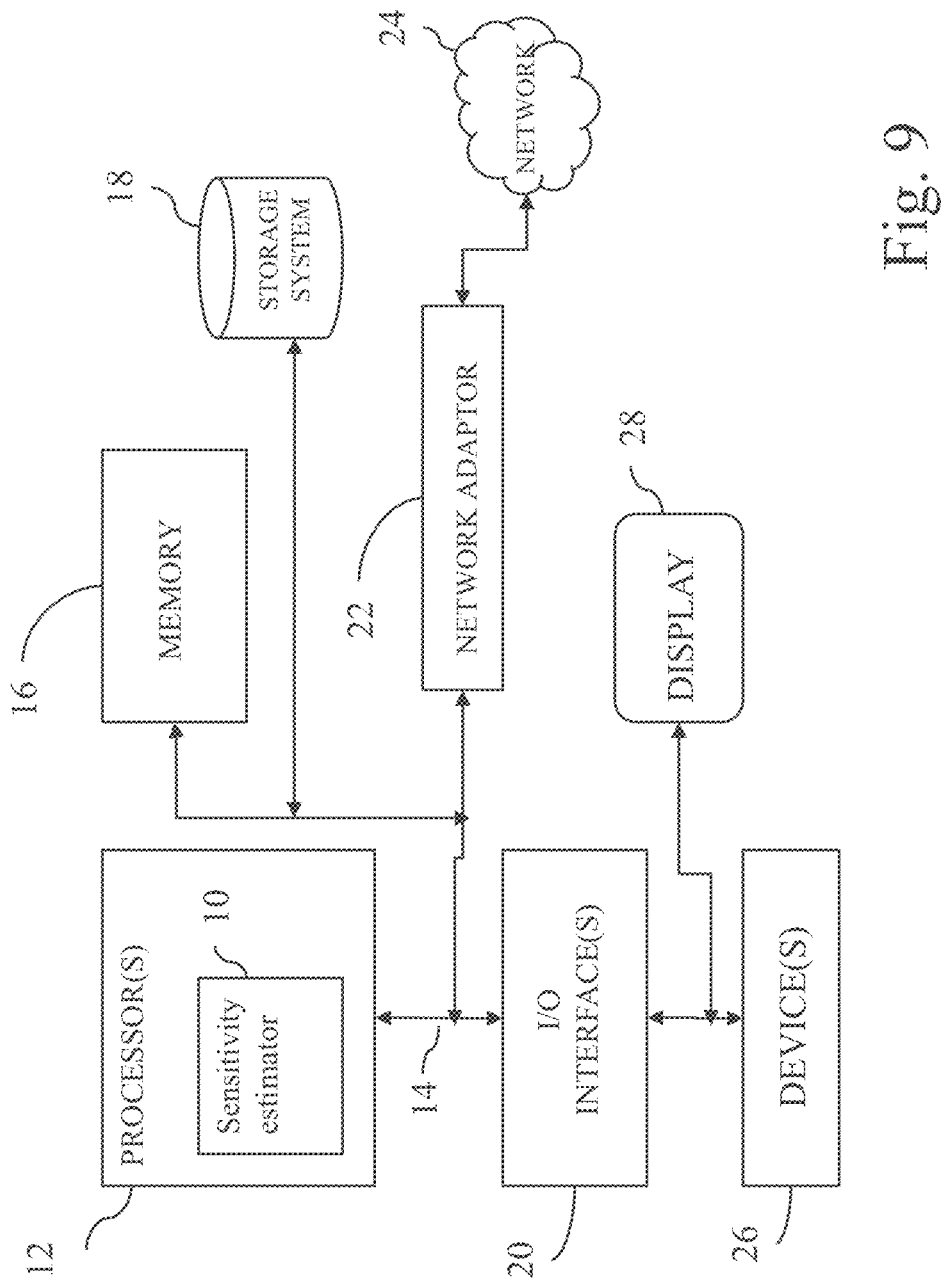
FIG. 9 illustrates a schematic of an example computer or processing system that may implement an asset sensitivity estimator system in one embodiment of the present disclosure.

FIG. 9 illustrates a schematic of an example computer or processing system that may implement the asset sensitivity estimation system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include an asset sensitivity module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for automatically estimating a sensitivity level of an information technology asset, comprising:
    a processor; and
    an asset sensitivity estimator operable to execute on the processor and further operable to obtain information about an asset, the asset sensitivity estimator further operable to compare characteristics of the asset assigned based on the information, with stored characteristics of known sensitive assets, the asset sensitivity estimator further operable to determine a sensitivity level of the asset based on the comparing, the asset sensitivity estimator obtaining the information without having to access the asset such that privacy of the computer network is preserved,
    the asset sensitivity estimator comprising a machine learning algorithm trained to learn the sensitivity level of the asset based on features comprising user features comprising job role, and indication of whether a user is a manager or non-manager, and organizational level, usage features comprising access frequency and access pattern, and external content features comprising external data content, wherein the features are normalized and input to the machine learning algorithm to train the processor, the processor executing the asset sensitivity estimator trained to determine the sensitivity level via the machine learning algorithm,
    wherein a corresponding sensitivity level is identified for each of multiple assets, the system facilitating computer security protection by automatically identifying a target asset among the multiple assets based on the corresponding sensitivity level for providing security protection.

2. The system of claim 1, wherein the asset sensitivity estimator is operable to obtain the information about an asset by one or more of identifying the user features comprising an identity of a user associated with the asset and user attributes associated with the user, identifying the usage features associated with the asset, and identifying the external content features from published data available outside the asset.

3. A computer readable storage medium storing a program of instructions executable by a machine to perform a method of automatically estimating a sensitivity level of an information technology asset, the method comprising:
    obtaining information about an asset of a computer system, without having to access the asset such that privacy of the computer system is preserved;
    assigning characteristics of the asset based on the information, comprising extracting features comprising user features comprising job role, an indication of whether a user is a manager or non-manager and organizational level, usage features comprising access frequency and access pattern, and external content features comprising external data content, wherein the features are extracted from the information obtained about the asset;
    comparing the characteristics of the asset with stored characteristics of known sensitive assets;
    determining a sensitivity level of the asset based on the comparing;
    training a machine by generating a machine learning algorithm to learn the sensitivity level based on a training set and a test set comprising the features extracted from the known sensitive assets, the features normalized to input to the machine learning algorithm; and
    the determining comprises executing the machine learning algorithm on the machine,
    wherein a corresponding sensitivity level is identified for each of multiple assets, the method facilitating computer security protection by automatically identifying a target asset among the multiple assets based on the corresponding sensitivity level for providing security protection.

4. The system of claim 1, wherein the machine learning algorithm comprises kNN-based algorithm.

5. The system of claim 1, wherein the machine learning algorithm comprises k-nearest centroids algorithm.

6. The system of claim 1, wherein the machine learning algorithm comprises kNN with distance metric learning.

7. The computer readable storage medium of claim 3, wherein the machine learning algorithm comprises kNN-based algorithm.

8. The computer readable storage medium of claim 3, wherein the machine learning algorithm comprises k-nearest centroids algorithm.

9. The computer readable storage medium of claim 3, wherein the machine learning algorithm comprises kNN with distance metric learning.

10. A system for automatically estimating a sensitivity level of an information technology asset, comprising:
    means for obtaining information about an asset, the information obtained without having to access the asset such that privacy of the computer network is preserved;
    means for assigning characteristics of the asset based on the information, comprising extracting features comprising user features comprising job role, an indication of whether a user is a manager or non-manager and organizational level, usage features comprising access frequency and access pattern, and external content features comprising external data content, wherein the features are extracted from the information obtained about the asset;

means for comparing the characteristics of the asset with stored characteristics of known sensitive assets;

means for determining a sensitivity level of the asset based on the comparing; and means for training a machine by generating a machine learning algorithm to learn the sensitivity level based on a training set and a test set comprising the features extracted from the known sensitive assets, the features normalized to input to the machine learning algorithm, the means for determining comprising executing the machine learning algorithm, wherein a corresponding sensitivity level is identified for each of multiple assets, the system facilitating computer security protection by automatically identifying a target asset among the multiple assets based on the corresponding sensitivity level for providing security protection.

11. The system of claim 1, wherein the processor allows intelligently backing up of the asset based on the determined sensitivity level.

12. The computer readable storage medium of claim 3, further comprising allowing intelligently backing up of the asset based on the determined sensitivity level.

* * * * *